(12) United States Patent
Kim et al.

(10) Patent No.: US 7,593,306 B2
(45) Date of Patent: Sep. 22, 2009

(54) DIFFRACTION ELEMENT AND OPTICAL PICK-UP APPARATUS HAVING THE SAME

(75) Inventors: Bong-gi Kim, Suwon-si (KR); Soo-han Park, Yongin-si (KR); Jang-hoon Yoo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 606 days.

(21) Appl. No.: 11/337,584

(22) Filed: Jan. 24, 2006

(65) Prior Publication Data

US 2006/0120248 A1    Jun. 8, 2006

(30) Foreign Application Priority Data

Nov. 18, 2004    (KR) ................. 2004-94452
May 11, 2005    (KR) ............. 10-2005-0039404

(51) Int. Cl.
*G11B 7/00* (2006.01)
(52) U.S. Cl. .................. 369/112.03; 369/109.02
(58) Field of Classification Search ............ 369/112.05, 369/44.37, 44.23, 44.24, 112.01, 112.1, 112.03, 369/112.02, 109.02
See application file for complete search history.

(56) References Cited

U.S. PATENT DOCUMENTS 5,066,138 A    11/1991    Toide

| 6,650,612 B1 * | 11/2003 | Matsuzaki et al. ..... 369/112.05 |
| 7,184,384 B2 * | 2/2007 | Ueyama et al. ........ 369/112.05 |
| 2003/0016448 A1 | 1/2003 | Takasuka |
| 2004/0081064 A1 | 4/2004 | Ohnishi et al. |
| 2005/0128896 A1 | 6/2005 | Katayama |
| 2005/0180293 A1 | 8/2005 | Ueyama et al. |

FOREIGN PATENT DOCUMENTS

| CN | 1523586 | 8/2004 |
| EP | 1 686 573 | 8/2006 |
| JP | 05-067341 | 3/1993 |
| JP | 05-290403 | 11/1993 |
| JP | 07-272310 | 10/1995 |
| JP | 338904 | 12/1996 |
| JP | 2003-045051 | 2/2003 |
| JP | 2004-005892 | 1/2004 |
| JP | 2004-253111 | 9/2004 |
| JP | 2004-334962 | 11/2004 |
| WO | WO-03/091999 | 11/2003 |
| WO | WO-2004/097815 | 2/2004 |

\* cited by examiner

*Primary Examiner*—Nabil Z Hindi
(74) *Attorney, Agent, or Firm*—Roylance, Abrams, Berdo & Goodman, L.L.P.

(57) ABSTRACT

A diffraction element for an optical pick-up apparatus is provided that enables more accurate focusing control. The diffraction element for an optical pick-up apparatus is divided into first and second regions, each being formed with a grid pattern in which grids are repeated with a predetermined pitch P. The grid pattern in at least one of the first and second regions is tilted by a predetermined angle with respect to a virtual line VL substantially perpendicular to a division line DL that divides the first and second regions.

14 Claims, 6 Drawing Sheets

DIFFRACTION ELEMENT AND OPTICAL PICK-UP APPARATUS HAVING THE SAME

CROSS-REFERENCE TO RELATED APPLICATIONS

This application claims the benefit under 35 U.S.C. § 119(a) of Korean Patent Application No. 2005-39404 filed May 11, 2005, in the Korean Intellectual Property Office, the entire disclosure of which is hereby incorporated by reference.

BACKGROUND OF THE INVENTION

1. Field of the Invention

The present invention relates to an optical pick-up apparatus. More particularly, the present invention relates to a diffraction element and an optical pick-up apparatus having the same.

2. Description of the Related Art

An optical pick-up apparatus is employed in a CDP (Compact Disc Player), a DVDP (Digital Versatile Disc Player), a CD-ROM driver, or the like to perform recording and reproducing of information of a disc, which is an optical medium, in a contactless manner. When recording information, such an optical pick-up apparatus illuminates a laser beam onto a surface of a disc to form pits. When reproducing recorded information, the optical pick-up apparatus optically reads out pit information formed on the disc and outputs the information in an electric signal. To record information on and reproduce information from a disc in this manner, the optical pick-up apparatus includes a laser diode, which is a light source for illuminating a laser beam; at least one diffraction element for splitting the beam projected from the light source into three beams; a beam splitter for controlling the deviation of the laser beam; plural lenses for forming an optical path; and plural optical devices, such as an optical detector, for detecting a signal.

Such an optical pick-up apparatus performs focusing control for controlling an objective lens in a vertical direction to align a beam spot onto a surface of a disc and tracking control for controlling the objective lens in a horizontal direction to make a beam follow a track on the disc. To perform the focusing control and the tracking control, it is necessary to produce a focus error signal (hereinafter, referred to as "FE signal") and a tracking error signal (hereinafter, referred to as "TE signal"). To produce an FE signal, an astigmatism method is usually employed. To produce a TE signal, although a push pull (hereinafter, referred to as "PP") method has been employed, a differential push pull (hereinafter, referred to as "DPP) method, in which three beams are used, has recently been employed. When the PP method is employed, a DC offset is produced in the TE signal due to objective lens shift and tilt caused as the tracking servo is performed, thereby causing an error in the TE signal.

The DPP method calculates a value of a signal by using a main beam illuminated to the center of a track and two sub-beams spaced by a predetermined distance from the main beam in radial and tangential directions, respectively, and illuminated around a groove. The DDP method has an advantage in that a DC offset produced in a TE signal by the objective lens shift and tilt can be cancelled. However, it is not possible to employ such a DPP method for discs different from each other in specification of track pitch because illumination positions of sub-beams are varied in such discs.

For this reason, a method illuminating three beams onto a track has been recently developed and employed, an example of which method is illustrated in FIGS. 1A to 1C. Referring to FIGS. 1A and 1B, a diffraction element 10 is divided into two regions 12 and 14, each being formed with a grid pattern in which grids are formed with a predetermined pitch P. The grid patterns respectively formed in the first and second regions are arranged to be deviated by a half pitch (½P) from one another to produce a phase difference in each sub-beam SBF and SBB before the sub-beams are incident onto a disc, wherein such a phase difference is produced when an existing sub-beam is illuminated onto a groove and a main beam is illuminated onto a track. A beam incident onto the diffraction element 10 configured as described above is diffracted and split into one main beam (MB), which is a zero order diffracted beam, and two sub-beams SBF and SBB, which are $\pm 1^{st}$ order diffracted beams, respectively, and of which one trails the other on a track T of a disc D. Additionally, the two sub-beams SBF and SBB are diffracted and split into two sub-beams SBF1 and SBF2, and SBB1 and SBB2, respectively, due to the separation of the first region 12 and the second region 14. The main beam MB and the sub-beams SBF and SBB diffracted by the diffraction element 10 are incident onto the disc D, and the beams incident onto the disc D are reflected and then received by an optical detector 20 as shown in FIG. 1C. Then, the optical detector 20 outputs a signal depending on the light intensity detected on each of the divided regions, whereby a TE signal and a FE signal are calculated. The FE signal is calculated through a differential astigmatism method that employs the astigmatism of a beam reflected from the disc D. According to the differential astigmatism method, the FE signal is calculated in such a manner of summing differences in signal values determined from respective diagonal regions of an optical detection element 20a for use in detecting a main beam and optical detection elements 20b and 20c, each for use in detecting a sub-beam.

However, as shown in FIG. IC, the two sub-beams SBF1 and SBB1, and SBF2 and SBB2, which correspond to the first region 12 and the second region 14 in the diffraction element 10, respectively, are received by the optical detection elements 20b and 20c in a state in which the two sub-beams are spaced and separated by a predetermined distance from each other. In this manner, because the two sub-beams SBF1 and SBB1, and SBF2 and SBB2 are spaced and separated from each other on the optical detection elements 20b and 20c by a predetermined distance, the difference in signal values in the diagonal regions of the optical detection elements 20b and 20c, (E1+E3)−(E2+E4) or (F1+F3)−(F2+F4), is equal to that obtained before the astigmatism is produced, even if astigmatism is produced in the splitted sub-beams SBF1 and SBB1, and SBF2 and SBB2 as indicated by dotted lines. That is, there may arise a case in which a difference between a signal value produced from the E1 and E3 regions (or F1 and F3 regions) and a signal value produced from the E2 and E4 regions (or F2 and F4 regions) equals zero identically before and after the astigmatism is produced. Therefore, an error can be caused in an FE signal determined through the differential astigmatism method, whereby not only the accuracy of focusing control but also the reliability of the optical pick-up apparatus may be deteriorated due to such an error.

Accordingly, a need exists for an improved diffraction element for an optical pick-up apparatus that enables more accurate focusing control.

SUMMARY OF THE INVENTION

Accordingly, an object of the present invention is to provide a diffraction element for an optical pick-up apparatus that allows more accurate focusing control, and an optical pick-up apparatus having the same.

A diffraction element for an optical pick-up apparatus is provided in which the element is divided into first and second regions, each being formed with a grid pattern in which grids are repeated with a predetermined pitch P. A grid pattern in at least one of the first and second regions is tilted by a predetermined angle with respect to a virtual line VL substantially perpendicular to a division line DL that divides the diffraction element into the first and second regions.

According to an exemplary embodiment of the present invention, the division line DL is substantially parallel to a tangential line of an optical medium, and each of the grid patterns is tilted with respect to the virtual line VL. Additionally, the grid patterns of the first and second regions are formed to be deviated by a half pitch (½P) from one another.

An optical pick-up apparatus includes a light source; at least one diffraction element for splitting a beam projected from the light source into three beams, the diffraction element being divided into first and second regions each formed with a grid pattern in which grids are repeated with a predetermined pitch P; an optical system for illuminating the beams split by the diffraction element onto an optical medium and guiding a beam reflected from the optical medium; and an optical detector for receiving a beam reflected from the optical medium and guided by the optical system to detect an information signal, an FE signal and a TE signal, wherein a grid pattern in at least one of the first and second regions is tilted by a predetermined angle with respect to a virtual line VL substantially perpendicular to a division line DL that divides the first and second regions.

Other objects, advantages, and salient features of the invention will become apparent from the detailed description, which, taken in conjunction with the annexed drawings, discloses preferred exemplary embodiments of the invention.

BRIEF DESCRIPTION OF THE DRAWINGS

The above aspects and features of the present invention will be more apparent from the description for certain exemplary embodiments of the present invention taken with reference to the accompanying drawings, in which.

Throughout the drawings, like reference numerals will be understood to refer to like parts, components and structures.

DETAILED DESCRIPTION OF EXEMPLARY EMBODIMENTS

Hereinbelow, exemplary embodiments of the present invention are described in detail with reference to accompanying drawings.

Figure 1A:
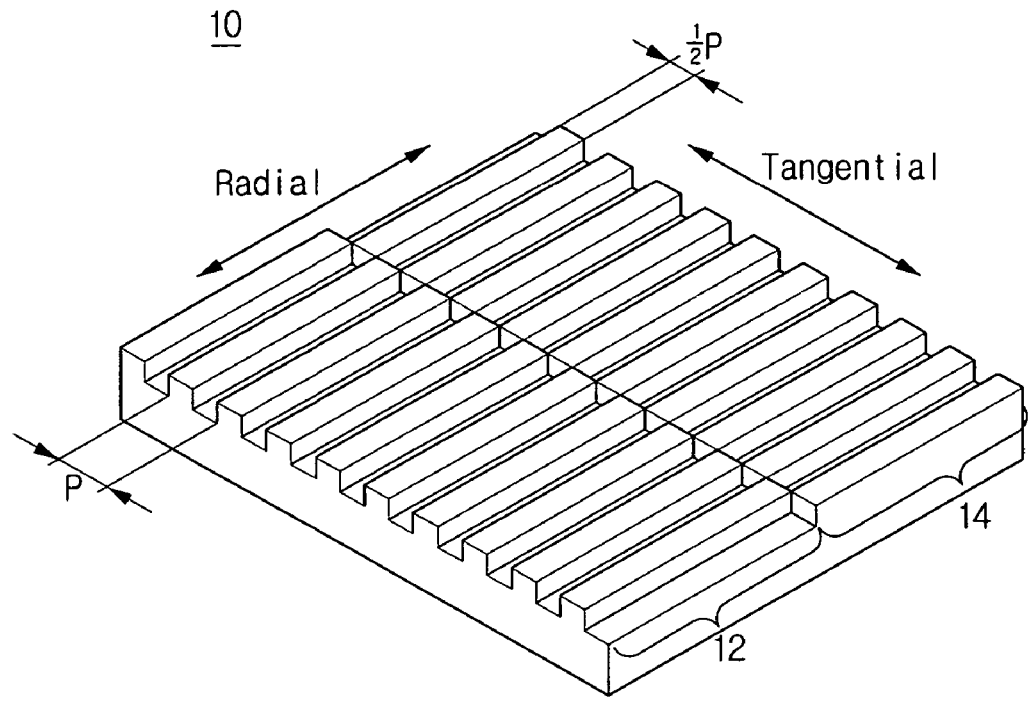
FIG. 1A is a perspective view schematically illustrating a conventional diffraction element.
Figure 1B:
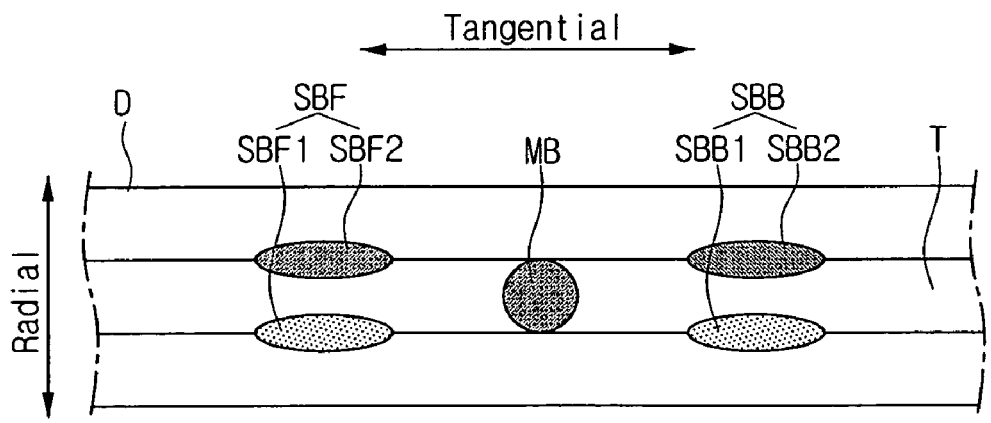
FIG. 1B is a top plan view diagrammatically illustrating an optical medium in a state in which beams diffracted by the diffraction element of FIG. 1A are illuminated onto the optical medium.
Figure 1C:
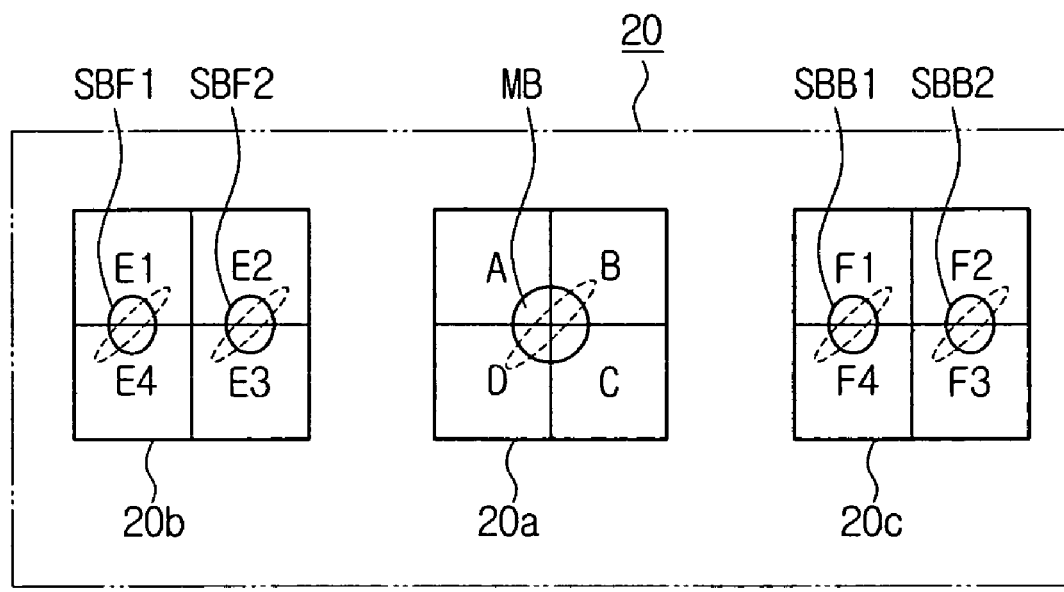
FIG. 1C diagrammatically illustrates an optical detector in a state in which the beams illuminated onto the optical medium are received by the optical elements thereof after they have been reflected from the optical medium.
Figure 2:
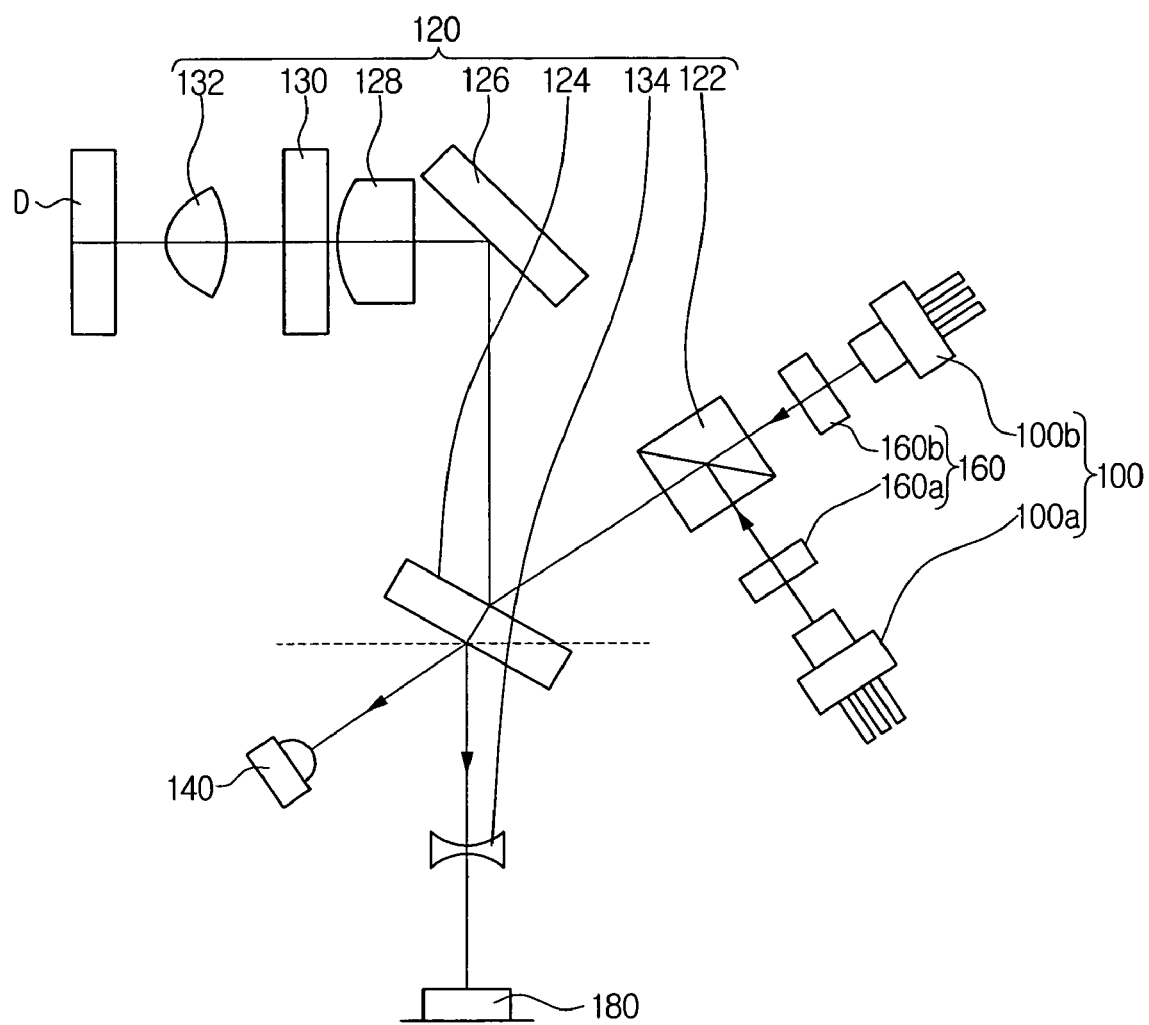
FIG. 2 diagrammatically illustrates an optical pick-up apparatus according to an exemplary embodiment of the present invention.

Referring to FIG. 2, an optical pick-up apparatus according to an exemplary embodiment of the present invention includes at least one light source 100, an optical system 120, a monitor optical detector 140, at least one diffraction element 160, and an optical detector 180. The monitor optical detector 140 may be implemented by an FPD (Front Photo Diode) and the optical detector 180 may be implemented by a PIDC (Photo Diode Integrated Circuit).

The at least one light source 100 includes a first light source 100a for a DVD and a second light source 100b for a CD. An LD (Laser Diode) with a wavelength is preferably employed in the light source 100. The first light source 100a records information on a DVD (Digital Versatile Disc) or reads information recorded on such a DVD, wherein the DVD has a track pitch (TP) (see FIG. 5) smaller than that of a CD and the first light source 100a projects a beam with a relatively short wavelength of approximately 650 nm. Additionally, the second light source 100b records information on a CD or acquires information recorded on such a CD, wherein the second light source 100b projects a beam with a wavelength of approximately 780 nm. Although the light sources for a CD and a DVD are exemplified, a light source, which projects a beam with a wavelength of approximately 405 nm for a BD (Blu-ray Disc), an HD-DVD (High Density Digital Versatile Disc) or the like, may be additionally included.

The optical system 120 includes a first beam splitter 122, a second beam splitter 124, a reflection mirror 126, a collimating lens 128, a ¼ wavelength plate 130, an objective lens 132, and a sensor lens 134.

A cubic beam splitter 122 may be employed as the first beam splitter 122, which reflects the beam projected from the first light source 100a to change the optical path of the beam and transmits the beam projected from the second light source 100b as it is. Such selective transmission of beams may be implemented by using the fact that the beams projected from the first and second light sources 100a and 100b are different from each other in wavelength or using polarization types of the projected beams.

The second beam splitter 124 reflects a part of the beams projected from the first beam splitter 122 toward the monitor optical detector 140 and reflects the remainder toward the reflection mirror 126.

The reflection mirror 126 changes the optical path of the beam reflected from the second beam splitter 124 so that the beam may be incident onto the objective lens 132 and reflects the beam reflected from an optical medium, such as a disc, toward the second beam splitter 124.

The collimating lens 128 converts a beam projected from the reflection mirror 126 into parallel beams.

The ¼ wavelength plate 130 converts one linearly polarized beam into one circularly polarized beam and converts the other circularly polarized beam reflected from the disc D into another linearly polarized beam. Since the specific action of such a ¼ wavelength plate is well known in the art, detailed description thereof is omitted.

The objective lens 132 focuses a beam projected from the ¼ wavelength plate onto the disc D.

The sensor lens 134 includes a concave lens and magnifies a spot of a beam reflected from the disc D to form a spot effective for the optical detector 180. Additionally, the sensor lens 134 may function to form astigmatism so as to detect an FE signal to be described later.

The monitor optical detector 140 receives a part of the beams projected from the first and second light sources 100a and 100b and measures the light intensities of the first and second light sources 100a and 100b. The measured light intensities are transmitted to a controller, which is not shown in the drawings, to control the voltage applied to the first and second light sources 100a and 100b, so that the light intensities of projected beams may be constantly controlled.

The at least one diffraction element 160, by which the present invention is characterized, includes a first diffraction element 160a for diffracting a beam projected from the first light source 100a and a second diffraction element 160b for diffracting a beam projected from the second light source 100b. Because the first and second diffraction elements 160a and 160b are substantially the same in function and configuration, the description of diffraction element 160 refers to both diffraction elements 160a and 160b.

Figure 3:
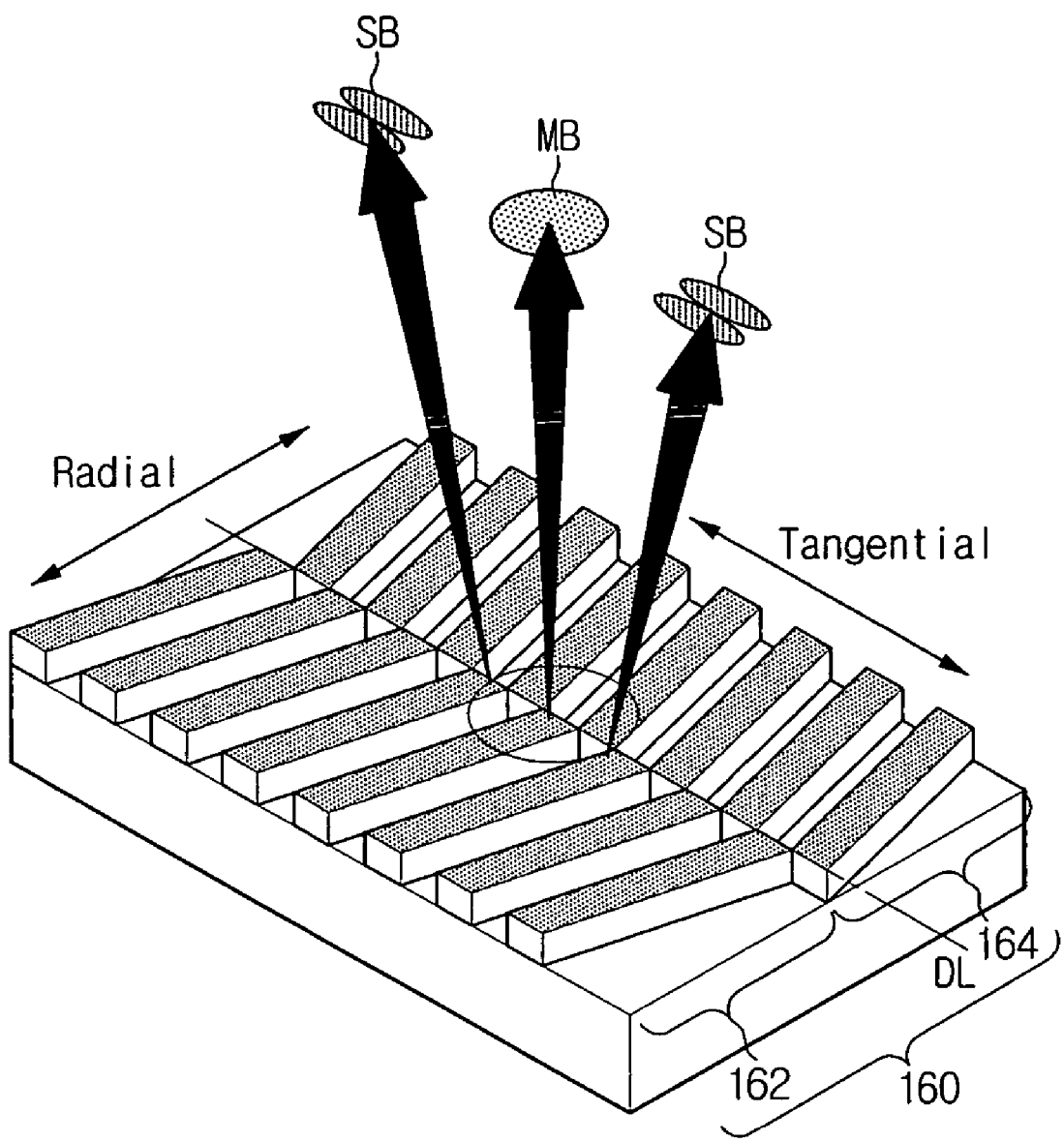
FIG. 3 is a perspective view schematically illustrating a diffraction element of FIG. 2.
Figure 4:
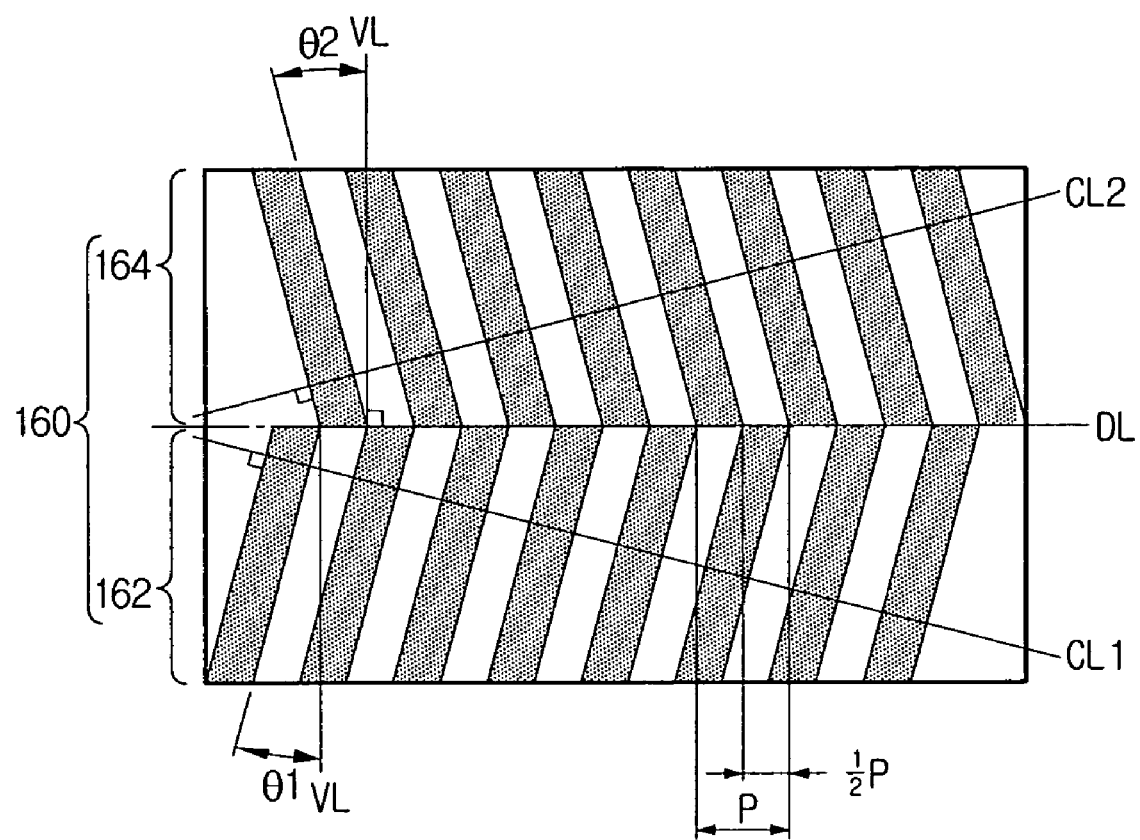
FIG. 4 is a top plan view of the diffraction element of FIG. 3.

Referring to FIGS. 3 and 4, each diffraction element 160a and 160b is divided into a first region 162 and a second region 164 about a division line DL. The division line DL is substantially parallel to the tangential direction, that is, the track direction of the disc D. The first region 162 and the second region 164 are tilted or angled by predetermined angles θ1 and θ2, respectively, with respect to a virtual line VL that is substantially perpendicular to the division line DL. The grid patterns respectively formed on the first and second regions 162 and 164 are deviated from one another by a half pitch (½P).

Figure 5:
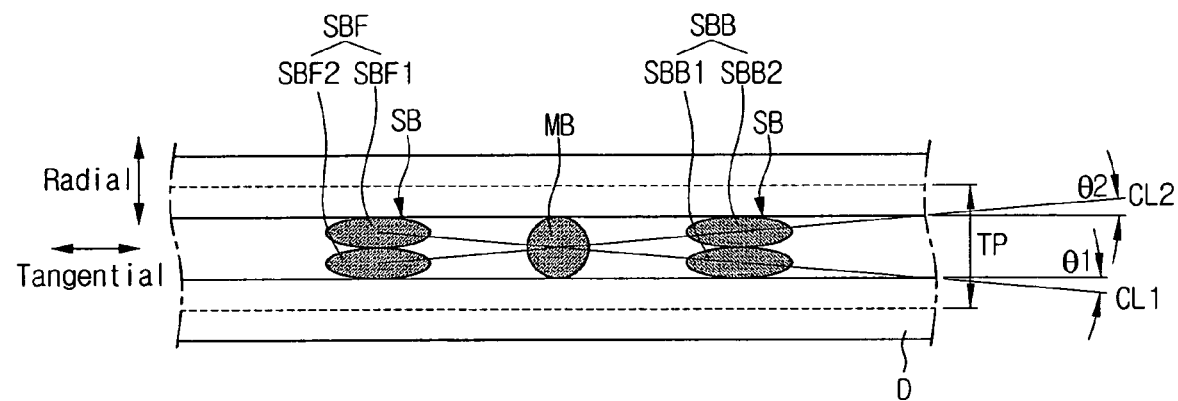
FIG. 5 is a top plan view illustrating an optical medium in a state in which beams diffracted by the diffraction element shown in FIG. 3 are illuminated onto the optical medium.

Referring to FIG. 5, the diffraction element 160 configured as described above splits a beam projected from the optical source 100 into a main beam MB, which is a zero order diffracted beam, and two sub-beams SBF and SBB, which are ±1$^{st}$ order diffracted beams. Additionally, the leading sub-beam SBF and the trailing beam SBB are respectively split into sub-beams SBF1 and SBB1, which correspond to the grid pattern of the first region 162, and sub-beams SBF2 and SBB2, which correspond to the grid pattern of the second region 164. At this time, the sub-beams SBF1 and SBB1 and the sub-beams SBF2 and SBB2, which respectively correspond to the first region 162 and the second region 164, are positioned on lines CL1 and CL2, which are substantially parallel to the lines substantially perpendicular to the grid patterns of the first and second regions 162 and 164, respectively. That is, the angle θ1 between the line CL1 interconnecting the sub-beams SBF1 and SBB1 corresponding to the first region 162 and a virtual line substantially parallel to the track T is equal to the line θ1 between the grid pattern of the first region 162 and the virtual line VL substantially perpendicular to the division line DL. Therefore, the two sub-beams SBF1 and SBB1 corresponding to the first region 162 are illuminated on the track T in the state of being tilted by the tilting angle θ1 of the grid pattern of the first region 162. This principle is substantially identically applied to the sub-beams SBF2 and SBB2 corresponding to the second region 164. Therefore, the angle θ2 between the line CL2 interconnecting the sub-beams SBF2 and SBB2 corresponding to the second region 164 and a virtual line substantially parallel to the track T is equal to the angle θ2 between the grid pattern of the first region 164 and the virtual line VL substantially perpendicular to the division line DL.

Accordingly, by adjusting the tilting of the patterns of the first region 162 and the second region 164 to adjust the positions of the sub-beams SBF1 and SBF2, and SBF2 and SBB2, it is possible for the two leading sub-beams SBF1 and SBF2 and the two trailing sub-beams SBB1 and SBB2 to be closely illuminated on the track T. More preferably, the two leading sub-beams SBF1 and SBF2 and the two trailing sub-beams SBB1 and SBB2 come into contact with each other. Preferably, the grid patterns of the first region 162 and the second region 164 are tilted in such a way that they form a V-shaped arrangement and respectively form angles θ1 and θ2 with respect to the virtual line VL that is substantially perpendicular to the division line DL. However, it is necessary to set the tilting angles of the grid patterns of the respective regions 162 and 164 to be different from each other due to various parts tolerance and assembly tolerance thereof.

By adjusting the tilting angles θ1 and θ2 of the grid patterns of the regions 162 and 164, the two leading sub-beams SBF1 and SBF2 and the two trailing sub-beams SBF2 and SBB2 may be illuminated to the disc in a state of being more closely arranged to one another, and, more preferably, in contact with each other.

Meanwhile, the grid patterns of the respective regions 162 and 164 are arranged to be deviated a half pitch (½P) from one another, so that a phase difference of 180 degrees is produced between the sub-beams SBF1 and SBB1 corresponding to the first region 162 and the sub-beams SBF2 and SBB2 corresponding to the second region 164. This allows a TE signal to be calculated with the DPP method even if a main beam MB and a sub-beam are illuminated on a track T, by previously forming a phase difference of each of the sub-beams SBF1 and SBF2, and SBB1 and SBB2 before they are incident onto the disc. However, it is possible to use various methods, such as forming a phase difference by changing the thicknesses of the respective regions 162 and 164, unlike the present exemplary embodiment.

Figure 6:
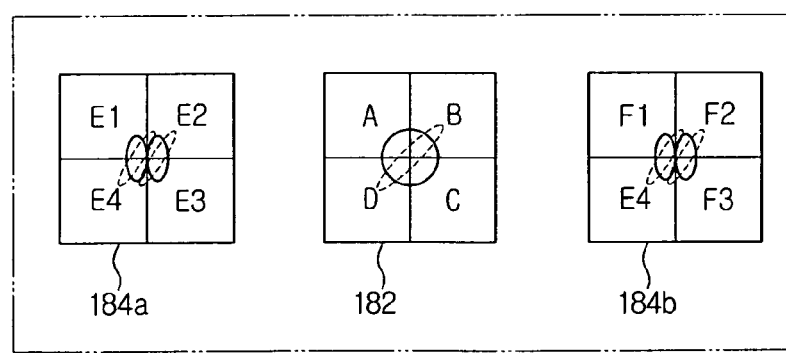
FIG. 6 illustrates an optical detector employed in the embodiment shown in FIG. 2 in a state in which the beams illuminated onto the optical medium of FIG. 5 are received by the optical detection elements thereof after they have been reflected from the optical medium.

Referring to FIG. 6, the optical detector 180 is a device for converting a beam reflected from the disc D into an electrical signal and detects an information signal (RF signal), an FE signal, and a TE signal. The optical detector 180 preferably includes three optical detection elements 182, 184a, and 184b. A main beam (MB, see FIG. 5) reflected from the disc D is illuminated onto the three optical detection elements 182, 184a and 184b of the optical detector 180 through the objective lens 132, the ¼ wavelength plate 130, the collimating lens 128, the second beam splitter 124 and the sensor lens 134 (see FIG. 2). The centrally arranged optical element 182 of the optical detector 180, which is an optical detection element for use in detecting a main beam, is divided into four regions, that is, A, B, C and D regions. Additionally, the optical detection elements 184a and 184b, each for use in detecting a sub-beam, are located at both sides of the optical element 182 for use in detecting a main beam and are divided into E1, E2, E3 and E4 regions, and F1, F2, F3 and F4 regions, respectively. The divided regions individually receive a main beam (MB) and a sub-beam (SB) (see FIG. 5), and independently output electrical signals depending on light intensity.

Additionally, the FE signal is obtained from the optical detector 180 through a differential astigmatism method, and the TE signal is obtained through a DPP method. If the electrical signals detected from the divided regions are a, b, c, and d, e1, e2, e3, and e4, and f1, f2, f3, and f4, respectively, the information signal (RF), the FE signal and the TE signal may be respectively calculated by Equations 1 to 3, as follows.

$$RF = a+b+c+d \qquad \text{Equation 1}$$

$$FE = [(a+c)-(b+d)]+k[(e1+e3)-(e2+e4)+(f1+f3)-(f2+f4)] \qquad \text{Equation 2}$$

where $k=(a+b+c+d)/(e1+e2+e3+e4+f1+f2+f3+f4)$ $$TE = (a+d)-(b+c)-k[(e1+e4)-(e2+e4)-(f1+f4)-(f2+f3)] \qquad \text{Equation 3}$$

where $k=(a+b+c+d)/(e1+e2+e3+e4+f1+f2+f3+f4)$

In Equations 2 and 3, k is a gain for compensation applied because a sub-beam (SB), which is a ±1$^{st}$ order refraction beam, is lower in light intensity than a main beam (MB), which is a zero order refraction beam.

Here, the FE signal obtained through the differential astigmatism method is calculated by a difference in signal values obtained in the diagonally located regions in each of the optical detection elements 182, 184a and 184b. Because the sub-beams SBF1 and SBF2, and SBB1 and SBB2 are separated from each other in the prior art, there may arise a case in which the value of (e1+e3)−(e2+e4) or (f1+f3)−(f2+f4) is not changed even if astigmatism is produced in the sub-beams SBF1 and SBF2, and SBB1 and SBB2. However, it may be appreciated that because the sub-beams SBF1 and SBF2, and SBB1 and SBB2 received by the optical detection elements 184a and 184b for sub-beams are in contact with each other according to the present exemplary embodiment, the value of (e1+e3)−(e2+e4) or (f1+f3)−(f2+f4) is changed if astigmatism is produced in the sub-beams SBF1 and SBF2, and SBB1 and SBB2 as indicated by dotted lines in FIG. 6. Accordingly, focusing control may be more accurately performed, because the FE signal may be more accurately detected by the differential astigmatism method.

As described above, according to the present invention, because sub-beams are allowed to be received in a state of being more closely arranged or in contact with each other by optical detection elements by dividing a diffraction element into two regions and adjusting the tilting of the grid pattern of each of the two regions of the diffraction element, the accuracy of an FE signal calculated through a differential astigmatism method may be improved, thereby allowing more accurate focusing control.

By improving the accuracy of focusing control, it is possible to improve the reliability of an optical pick-up apparatus.

Although representative exemplary embodiments of the present invention have been shown and described in order to exemplify the principle of the present invention, the present invention is not limited to the specific embodiments. It will be understood that various modifications and changes may be made by one skilled in the art without departing from the spirit and scope of the invention as defined by the appended claims. Therefore, it shall be considered that such modifications, changes and equivalents thereof are all included within the scope of the present invention.

What is claimed is:

1. A diffraction element for an optical pick-up apparatus, comprising:
   first and second regions formed in the element with a grid pattern in which the grids are repeated with a predetermined pitch P; and
   at least one of the first and second regions has a grid pattern tilted by a predetermined angle with respect to a virtual line (VL) that is substantially perpendicular to a division line (DL) that divides the first and second regions,
   wherein the grid pattern of the first region and the grid pattern of the second region are formed to be deviated from each other such that corresponding grid patterns on opposite sides of the division line are not mirror images of one another.

2. The diffraction element as claimed in claim 1, wherein the division line is substantially parallel to a tangential line of an optical medium.

3. The diffraction element as claimed in claim 2, wherein each of the grid patterns is tilted with respect to the virtual line VL.

4. The diffraction element as claimed in claim 1, wherein the grid pattern of the first region and the grid pattern of the second region are deviated by a half pitch from each other.

5. The diffraction element as claimed in claim 1, wherein a sub-beam (SBF1 or SBB1) corresponding to the first region and a sub-beam (SBF2 or SBB2) corresponding to the second region are in contact with each other when the sub-beams are illuminated onto an optical medium.

6. The diffraction element as claimed in claim 3, wherein each of the grid patterns is tilted at a different angle with respect to the virtual line (VL).

7. An optical pick-up apparatus, comprising:
   at least one light source;
   at least one diffraction element for splitting a beam projected from the light source into three beams, the diffraction element being divided into first and second regions each formed with a grid pattern in which grids are repeated with a predetermined pitch P;
   an optical system for illuminating the beams split by the diffraction element onto an optical medium and guiding the beams reflected from the optical medium; and
   an optical detector for receiving a beam reflected from the optical medium and guided by the optical system to detect an information signal, a focus error (FE) signal and a tracking error (TE) signal,
   wherein a grid pattern in at least one of the first and second regions is tilted by a predetermined angle with respect to a virtual line (VL) that is substantially perpendicular to a division line (DL) that divides the first and second regions, and
   wherein the grid pattern of the first region and the grid pattern of the second region are formed to be deviated from each other such that corresponding grid patterns on opposite sides of the division line are not mirror images of one another.

8. The optical pick-up apparatus as claimed in claim 7, wherein
   the division line is substantially parallel to a tangential line of an optical medium.

9. The optical pick-up apparatus as claimed in claim 8, wherein
   each of the grid patterns is tilted with respect to the virtual line (VL).

10. The optical pick-up apparatus as claimed in claim 9, wherein
    each of the grid patterns is tilted at a different angle with respect to the virtual line (VL).

11. The optical pick-up apparatus as claimed in claim 8, wherein
    the grid pattern of the first region and the grid pattern of the second region are formed to be deviated by a half pitch from each other.

12. The optical pick-up apparatus as claimed in claim 7, wherein
    the at least one light source includes first and second light sources each for use in different optical mediums.

13. The optical pick-up apparatus as claimed in claim 12, wherein
    the at least one diffraction element includes first and second diffraction elements for diffracting beams projected from the first and second light sources, respectively.

14. The optical pick-up apparatus as claimed in claim 13, wherein the optical system includes a first beam splitter for changing the path of the beam projected from the first light source and transmitting the beam projected from the second light source;

a second beam splitter for changing the path of the beam projected from the first beam splitter and guiding the beam reflected from the optical medium to the optical detector;

a collimating lens for changing the beams projected from the second beam splitter into parallel beams; and an objective lens for focusing the beams projected from the collimating lens to the optical medium.

* * * * *

UNITED STATES PATENT AND TRADEMARK OFFICE
CERTIFICATE OF CORRECTION

PATENT NO. : 7,593,306 B2  Page 1 of 1
APPLICATION NO. : 11/337584
DATED : September 22, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Twenty-first Day of September, 2010

David J. Kappos
*Director of the United States Patent and Trademark Office*